US012697746B1

(12) United States Patent
Devai et al.

(10) Patent No.: US 12,697,746 B1
(45) Date of Patent: Aug. 4, 2026

(54) COUNTERTOP TEMPLATE MATERIAL AND METHOD OF USE

(71) Applicants: Samuel Devai, Newcastle, CA (US); Edward Dumitru, Lincoln, CA (US)

(72) Inventors: Samuel Devai, Newcastle, CA (US); Edward Dumitru, Lincoln, CA (US)

( * ) Notice: Subject to any disclaimer, the term of this patent is extended or adjusted under 35 U.S.C. 154(b) by 113 days.

(21) Appl. No.: 18/901,790

(22) Filed: Sep. 30, 2024

Related U.S. Application Data

(60) Provisional application No. 63/541,476, filed on Sep. 29, 2023.

(51) Int. Cl.
*B26D 7/26* (2006.01)

(52) U.S. Cl.
CPC .................................... *B26D 7/26* (2013.01)

(58) Field of Classification Search
CPC .......... B26D 7/26; A47B 13/08; A47B 77/022
USPC ................................ 312/140.1, 140.2, 140.3
See application file for complete search history.

(56) References Cited

U.S. PATENT DOCUMENTS

| | | | | | |
|---|---|---|---|---|---|
| 4,831,739 | A * | 5/1989 | Davidson | B43L 7/14 | 33/427 |
| 5,107,601 | A * | 4/1992 | Semchuck | A47K 10/10 | 33/759 |
| 5,666,737 | A * | 9/1997 | Ryan, III | G01B 3/02 | 33/759 |
| 6,553,683 | B1 * | 4/2003 | Klass | E04F 21/18 | 33/456 |
| 6,978,529 | B1 * | 12/2005 | Pearse | B28D 1/047 | 29/557 |
| 6,986,210 | B1 * | 1/2006 | Conway | G01B 3/14 | 33/562 |
| 7,226,517 | B2 * | 6/2007 | Lane | A47B 96/202 | 156/258 |
| 8,215,726 | B1 * | 7/2012 | Klassen | A47B 96/18 | 427/202 |
| 2002/0059177 | A1 * | 5/2002 | Hansen | G06F 3/043 | |
| 2006/0150576 | A1 * | 7/2006 | Boone | A47B 13/10 | 52/287.1 |
| 2006/0191628 | A1 * | 8/2006 | Chapman | A47B 96/18 | 156/256 |
| 2013/0037197 | A1 * | 2/2013 | Harvey | E04F 13/144 | 156/64 |

* cited by examiner

*Primary Examiner* — James O Hansen
(74) *Attorney, Agent, or Firm* — Heisler & Associates

(57) ABSTRACT

A roll of template material has an elongate form between ends and with opposing parallel lateral edges defining a width thereof. Holes are optionally provided passing through the material from a top surface to a bottom surface. Template segments are formed by cutting the roll. Alternatively, the template material can be provided in linear segments. In a method of use, template segments are placed adjacent to edges of a cabinet top with the holes aligned with the cabinet top edge. The template segments are joined together or marked where they overlap to form a full template. The template segments can then be transported to a sheet location and reassembled upon a sheet for cutting thereof at outermost lateral edges of the full template, and to provide for cutting of the sheet into a countertop with an overhanging edge matching spacing between the holes and lateral edges of the template segments.

11 Claims, 8 Drawing Sheets

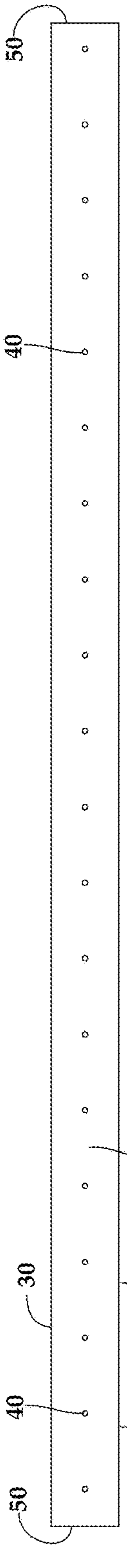
*Fig.6*
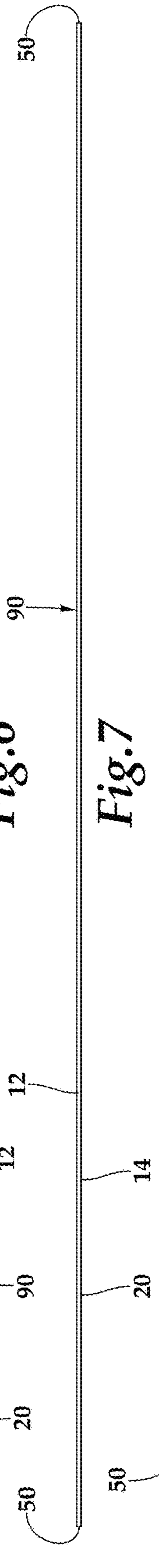
*Fig.7*
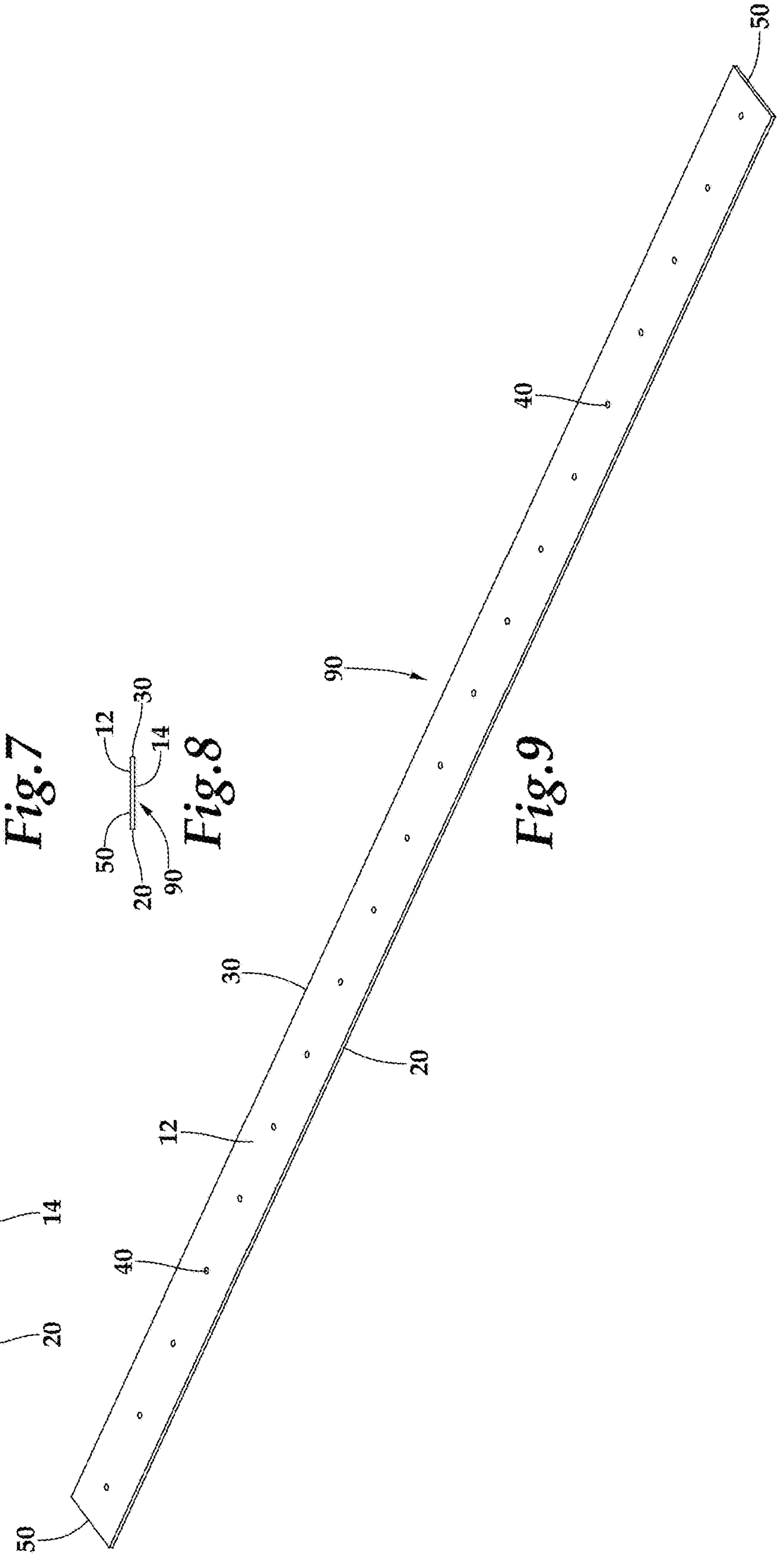
*Fig.8*
*Fig.9*

COUNTERTOP TEMPLATE MATERIAL AND METHOD OF USE

CROSS-REFERENCE TO RELATED APPLICATIONS

This application claims benefit under Title 35, United States Code § 119 (e) of U.S. Provisional Application No. 63/541,476 filed on Sep. 29, 2023.

FIELD OF THE INVENTION

The following invention relates to templates and methods for using templates when forming countertops and other similar covering structures. More particularly, this invention relates to templates which can be aligned with edges of cabinets and cabinet tops thereof or similar underlying structures, and which templates provide an appropriate offset to produce a desired amount of overhang for a countertop fabricated to be placed upon the cabinet.

BACKGROUND OF THE INVENTION

When constructing countertops of solid surfacing material, such as granite and other forms of stone, as well as using sheets of various different synthetic (or natural) materials, a variety of steps are involved. One important step is to first take detailed measurements as to the shape of the countertops and cabinets and cabinet tops and other surfaces which are to have the countertops of solid surfacing material placed thereon. The cabinet tops and other surfaces to be covered with the countertops of solid surfacing material are typically relatively large areas, but the important details tend to be along edges thereof. Another complexity at these edges is that typically the countertop is sized to overhang over at least a front edge of the cabinet top or other surface. It is known in the prior art to create a template for these edges of the cabinet tops and other surfaces to be covered by solid surfacing countertops. These templates need to account for the oversizing of a lip or other overhang of the countertop, beyond an edge of cabinet tops or other underlying support structures for the countertops or other surfaces.

It is known in the prior art to provide template materials, generally in the form of thin 4 inch wide sheets of styrene in lengths such as 8 foot lengths. These thin styrene sheets can be temporarily attached to the countertop, such as with careful placement hanging over edges of the countertop a desired amount. These multiple separate styrene sheets can be labeled so that a fabricator knows where each template belongs in the overall solid surfacing construction project. Once the long thin sheets have been appropriately placed, marked (such as at locations of corners, seams, etc.) and labeled, these template sheets can be removed from the countertop and taken to a fabricator's shop. The template sheets can then be placed onto stone or other solid surfacing sheets and rearranged into a full template to define where cuts need to be made in the sheet of material to form the solid surfacing countertop or other finished surface, to match shape and dimensions indicated by the full template. The stone or other solid surfacing thus has a shape and size needed to fit on the cabinet tops.

While this process is generally effective, it suffers from multiple drawbacks and undesirable complexity, presenting opportunities for improvement. One of the most time consuming parts of properly forming full templates is to properly position the separate template sheets on the cabinet tops with the appropriate overhang of the edges of the cabinet tops. A common overhang is a 1.5 inch overhang. Installers must carefully place the template with approximately 1.5 inches hanging over the edge, and then measure the template at multiple places along the template, and continue to move the template until the template is parallel with the edge of the cabinet top and 1.5 inches away from the cabinet top at all locations thereon, before fixing the template to the surface. This whole process is done while either looking down on the template and the tape measure, where only portions of the tape measure not covered by the template can be seen, or attempting to work from below the template and look up at a tape measure and the template from below. This is awkward and difficult. Thus, a need exists for a template item which can automatically be positioned a desired overlapping distance away from an edge of the cabinet top, without requiring measurement, or with minimal measuring requirements.

Lengths of template sheet material are typically provided in stacks for most efficient transportation and storage before sale. At 8 feet long, the relatively flexible styrene sheets are rather unwieldy to handle and provide only a limited amount of templating material, such as approximately enough for one kitchen full of surfaces. If the sheets of template material are shorter, a greater likelihood is presented that individual templates will not be long enough to define a long flat edge of a countertop or other surface which is to receive the solid surfacing material, so that individual pieces of template material need to be spliced, overlapped, or otherwise used together for a single edge. If the sheets are longer, they are even more difficult to transport and handle, and also can break under their own weight.

No perfect compromise as to length is suitable for all circumstances, so that fabricators are regularly needing to use multiple elongate template sheets which are not quite long enough, or wasting material because the 8 foot long sheets are too long, while always attempting to handle stacks of 8 foot long sheets of highly flexible material. Potential for snapping type breakage during handling is also presented. Accordingly, a need exists for a better configuration for shipping, storage and merchandising of template material, especially to maximize convenience and minimize potential for waste.

Other problems with prior art templating material are also presented, which are addressed to some extent by the invention described herein. This invention thus meets the need for convenient, accurate and fast templating materials for use in construction of solid surfacing, such as for cabinet tops and other underlying surfaces.

SUMMARY OF THE INVENTION

With this invention, templating material is provided in long spiral rolls of styrene sheets, which rolls are in one case 3.25 inches wide and rolled up into a roll, such as approximately 100 feet per roll. The roll would typically have approximately an empty 1 foot diameter at an inner portion of the roll (which could be totally empty or filled with a mandrel), and approximately a 2 foot diameter at an outer portion of the roll. Such rolls with this configuration are easy to handle as a single unit. Maximum curvature at an innermost portion of the roll is not so great that it causes fracture or other breakage of the template material.

The roll can be secured merely with a free outer end of the roll taped down, for a minimum of packaging to keep the roll intact. As an alternative, other forms of packaging such as bands looping through the inner portion and outer portion of the roll, or shrink wrap (or paper wrapping or other wrapping), could be provided to further stabilize the roll of templating material before use. Should the roll become unwound, it can merely be rolled up again and re-taped or otherwise secured. A partially used roll can easily still be rolled up and stored for future use on another project.

Based on a job that the fabricator is faced with, segments of templating material can be readily cut off of the roll to a desired length. Almost no waste is involved, except perhaps at the very end of a roll, when the final piece left over is not sufficiently long to be usable. Risk of loss due to damage during shipping or other handling by merchandisers is significantly reduced. Furthermore, convenience is provided to the fabricator who takes possession of such rolls of templating material.

Importantly, the size of the templating material in one embodiment is provided with a 3.25 inch width. Also, a ¼ inch hole is drilled through the templating material at a typically regular spacing along its length. In one embodiment, holes are provided every 6 inches. With such holes strategically placed at midpoints between lateral edges of the templating material, a 1.5 inch amount of templating material is provided between each lateral edge and a portion of the central hole closest to each lateral edge. It can thus be seen that a fabricator can very quickly place the template segment of templating material where required on a cabinet top for properly forming the full template for future fabrication of solid surfacing material into a countertop at the fabricator's shop or other location.

In particular, and according to a method of this invention, a user would first cut a length of templating material off of a roll which approximately matches a length of a side of the countertop to be represented by the template. As an example, a front edge of a countertop might be 7 feet long. A 7 foot (or slightly more, such as half a foot more) length of templating material would be cut off of the roll. The 7 foot length of templating material would then be placed upon the cabinet top. The holes passing through the templating material are then lined up with the edge of the cabinet top. The fabricator can look through the holes to see where the edge of the cabinet top is, and so can perfectly place the template segment with the required overhang. Slightly more than 50% of the template is resting upon the cabinet top, so that the template segment can barely rest on top of the cabinet top, and with the edge of the cabinet top just very barely visible through the holes in the template segment. When so positioned, the fabricator can optionally then staple, tape or otherwise temporarily attach the template segment to the cabinet top. That edge of the cabinet top has now been templated. Note that only one measurement was required, that of the length of the countertop edge being represented by the template.

The fabricator can then go to the next edge of the cabinet top and perform a similar procedure. Where template segments come together, such as at corners, these templates could be marked so their overlap can be reproduced at the fabricator's shop, or, most preferably, a styrene solvent (such as a PVC glue solvent) or other adhesive can be used to simply bond the styrene template portions together where they overlap. Alternatively, a fastener can be used, such as staples, tape, etc. to join the segments together. Thus the entire perimeter of the countertop (and any interior details or interior template support pieces) have been templated by the placing of template material where needed, and writing appropriate detail markings on the templating material itself. The template segments that now form the full template can then all be separated from the cabinet top, rolled up into a cylinder (or otherwise compacted) and transported to the fabricator's shop (or other countertop forming location).

At the fabricator shop, the multiple segments of templating material (formed into the full template) can be unrolled and placed over sheets of solid surfacing (or reconstructed following notes placed where the templating material overlaps) and taped or otherwise fastened to the solid surfacing sheet(s) at appropriate locations to then act as a guide for cutting of the sheet(s) of solid surfacing material to form the countertop or other overlying surfacing. The fabricator can use known techniques for matching grain of different sheets of solid surfacing material for a most desirable aesthetic experience and presentation. Finally, the templates can be used for cutting of the solid surfacing sheets, and to produce the individual pieces of solid surfacing countertop which can then be returned to the job site for installation upon the cabinet top and other surfaces to be covered with the countertop of solid surfacing material.

While this invention is described in detail with one embodiment which is 3.25 inches wide and with a ¼ inch hole provided at 6 inch intervals midway between lateral edges of the templating material, other dimensions for the template material and the holes could be provided in alternative embodiments. For instance, the templating material could be 3.5 inches wide and ½ inch holes could be provided passing through the templating material. Such a templating material would still be typically provided for a 1.5 inch overhang. Other sizes of overhangs could be accommodated such as a 2 inch overhang by providing the templating material being 4.25 inches wide with ¼ inch holes centered thereon. While the templating material is described herein as primarily having two parallel straight lateral edges, it is conceivable that the templating material could be prefabricated to provide undulating curves, zigzags, or other repeating fringe patterns.

While this invention is contemplated as being provided in a form which includes both rolls of templating material and with the templating material having the central holes therein for quick alignment to provide the appropriate overlap for edges of countertops, these two features could be provided separately from each other in alternative embodiments. For instance, rolls of templating material could be provided without the central holes for overhang sizing. Conversely, the template material could be provided with holes for overhang sizing, but in linear sheets, rather than in rolls, and still provide some of the benefits of this invention. All the dimensions used herein have been English dimensions, but corresponding or unique metric measurements could similarly be utilized.

While the holes are preferably provided at a midpoint between lateral edges of the templating material, it is conceivable that the holes could be provided at a specific regular spacing between the two lateral edges which is not a midpoint between the two lateral edges, but closer to one edge then the other edge. As an example, the template material could be 4 inches wide between lateral edges with the holes being 1.5 inches from one edge, 2.25 inches from the other edge and the holes being ¼ inch in diameter themselves. With such a configuration, one templating material could conceivably be utilized both for providing a 1.5 inch overhang or a 2.25 inch overhang. In a similar manner, other asymmetric central space placements could be provided so that one templating material could be used for two different standard overhang measurements. If the two different overhang measurements are similar to each other, so that one cannot readily see which side of the central hole has the larger size and which side of the central roll has the smaller dimension, markings could be provided on the templating material, such as measurement indicia adjacent to at least some of the holes, so that one can always orient the templating material with the proper orientation to provide the desired countertop overhang.

The holes through the templating material are generally shown and described as being circular. However, they could have other shapes including ovals, squares, triangles, diamonds, stars, or other shapes. Circles beneficially minimize propagation of cracks.

A dispenser is also provided for the templating material. Templating material typically is provided within a spiral roll or spool. A dispenser is provided in one configuration with left and right halves which nest one within the other and have an annular recess into which a spool of the templating material can be located. At least one of these halves includes a cylindrical hub structure which is at least slightly smaller than a central cylindrical open space within the spool of templating material. Typically, this hub is smaller than the central open space by a tolerance amount, such as at least about ¼ inch. An outer diameter of the annular space inside of the dispenser is slightly greater than an outer diameter of the spool of templating material when at an initial size before any templating material has been taken off of the spool. Typically, this outer diameter is slightly oversized, such as by at least about ¼ inch, to provide clearance.

A slot is provided in a cylindrical outer perimeter wall of the dispenser. This slot extends through both the left and the right halves of the dispenser in one embodiment, and the slot is large enough to allow the templating material to have a tip of a spool/roll thereof pass through this slot to an exterior of the dispenser. Typically, the outer perimeter wall of the dispenser deviates slightly from a perfect cylindrical form at lower portions thereof in the form of feet spaced apart by a flat segment, which is about ⅔ of a size of a diameter of the dispenser. Thus, the dispenser can stand on these feet and flat segment when resting upon an underlying substantially planar horizontal surface, ready to dispense templating material.

The spool/roll of templating material is placed in the dispenser so that the templating material extends to the tip in a clockwise direction, and with the tip outside of the dispenser, and a short "tongue" of the templating material also extends out of the dispenser for easy gripping by a user. Preferably a metal (or other hard material) plate is provided on an exterior of the dispenser, directly adjacent to the slot, and with a horizontal lower edge of this plate located just above the slot (when the dispenser is resting on its feet upon a horizontal surface. Templating material can be pulled out of the dispenser to a distance defining an amount of templating material which is needed by the user. The user can then use a knife (or other scoring tool) resting against the lower edge of the metal plate to score the templating material. The templating material is then fed out of the dispenser for a further short distance, such as an extra 6 inches, and then "snapped" at the score line which has just been formed. This leaves a new "tongue" of templating material extending from the dispenser.

When the dispenser is empty, a new roll of templating material can be obtained and the left and right halves of the dispenser can be opened from each other and the new roll of templating material can be located within the annular recess of the dispenser. Left and right halves are then brought back together and nested within each other to close the dispenser around the new roll of templating material. This process typically includes also feeding a new "tongue" at a tip of the templating material out through the slot in the dispenser.

OBJECTS OF THE INVENTION

Accordingly, a primary object of the present invention is to provide a method for cutting a sheet or slab of material to form a countertop to be placed upon a cabinet, and with a desired overhang for edges of the countertop.

Another object of the present invention is to provide an easy to use and easy to precisely position upon a cabinet top templating material for use in a method for cutting material to form a countertop to be placed upon the cabinet, and with a desired overhang for edges of the countertop.

Another object of the present invention is to provide a countertop forming templating material which can be provided in a roll of elongate material for ease of handling when not in use and ease of dispensing for use.

Another object of the present invention is to provide a dispenser for a roll of templating material from which templating material can be dispensed and easily cut to a desired length.

Another object of the present invention is to provide templating material for edges of a countertop which include holes therein for convenient alignment thereof upon a cabinet top, and with edges of the template material then automatically providing a desired position for edges of the countertop to be cut and placed upon the cabinets.

Another object of the present invention is to simplify the process of cutting a slab of stone or other countertop material for placement upon a cabinet or similar structure.

Another object of the present invention is to improve precision with which a countertop is formed for desired sizing and overlapping of a cabinet top or other structure upon which the countertop is placed.

Another object of the present invention is to provide a template forming system for countertop fabrication which minimizes waste of templating material.

Other further objects of the present invention will become apparent from a careful reading of the included drawing figures, the claims and detailed description of the invention.

BRIEF DESCRIPTION OF THE DRAWINGS

FIG. 6 is a top plan view of a linear template segment with holes therein according to one embodiment of this invention.

FIG. 7 as a front elevation view of that which is shown in FIG. 6, the rear elevation view being a mirror image.

FIG. 8 is a left end elevation view of that which is shown in FIG. 6, the right end elevation view being a mirror image.

FIG. 9 is a perspective view of that which is shown in FIG. 6.

DESCRIPTION OF THE PREFERRED EMBODIMENT

Figure 1:
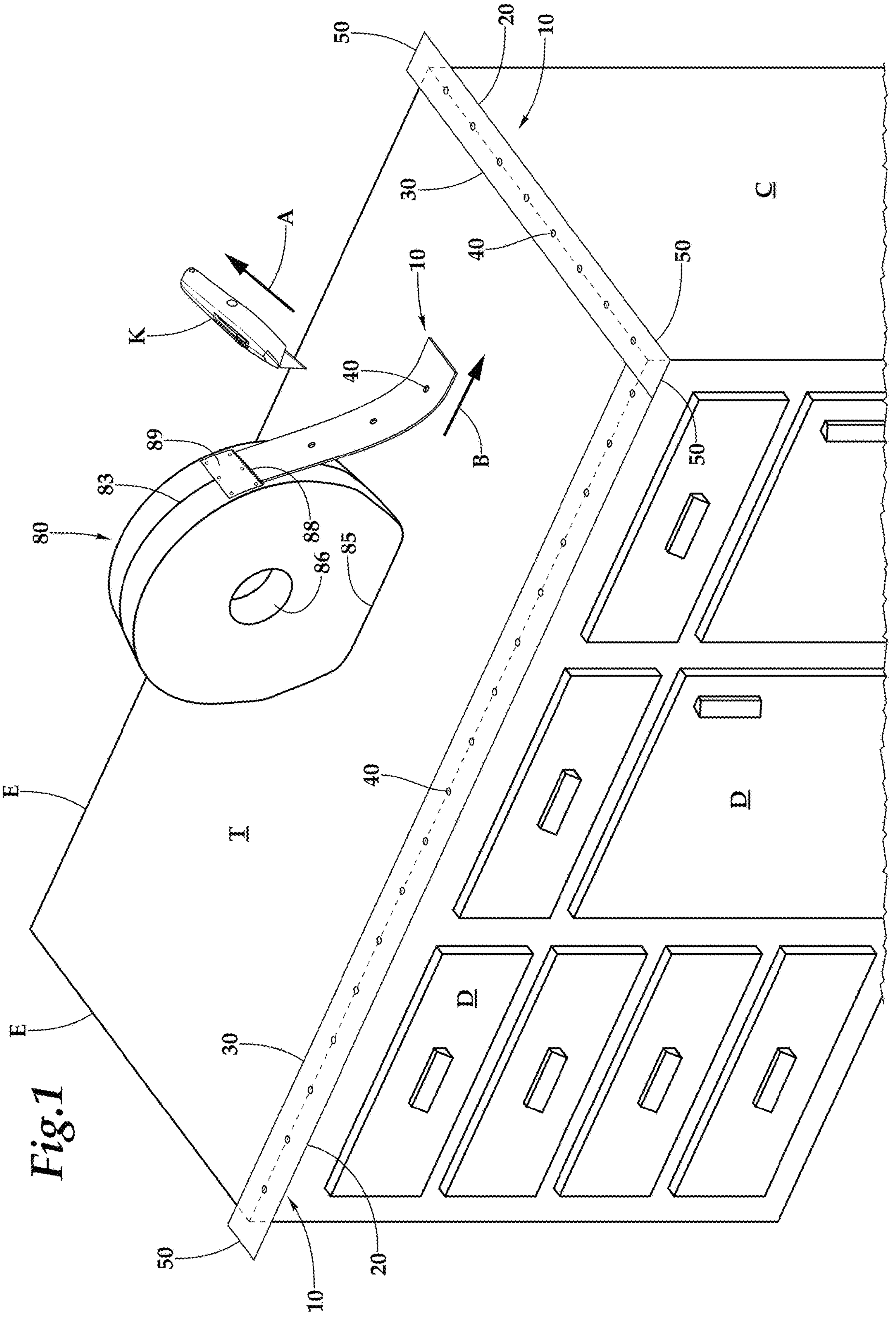
FIG. 1 is a perspective view of a cabinet with template segments that have been placed upon edges of the cabinet top for some of the edges, and with a dispenser dispensing templating material to provide further template segments for placement over other edges of the cabinet top as a first step in a template forming process for forming a countertop with a desired overhanging drip edge, when placed upon the cabinet top.

Referring to the drawings, wherein like reference numerals represent like parts throughout the various drawing figures, reference numeral 10 (FIGS. 1-3) is directed to a template segment for use according to a method of this invention, for constructing a full template 60 (FIG. 3) to guide a grinding tool G or other cutting tool to cut/form a slab S or other sheet that is to be sized to provide a countertop CT (FIG. 4) with a desired finished edge F overhanging an edge E (FIGS. 1 and 2) of a top T of a cabinet C.

In essence, and with particular reference to FIGS. 1 and 6-9, basic details of the template material 10 are described, according to one example embodiment. In this example embodiment, a template segment 10 is provided which is originally in the form of a roll 70 (FIG. 5) of template material which can optionally be dispensed from a dispenser 80. Each template segment 10 includes a first lateral edge 20 parallel with a second lateral edge 30. Midline holes 40 are located midway between these edges 20, 30. Ends 50 of the template segments 10 are provided by cutting the roll 70 of template material. Alternatively, linear segments 90 (FIGS. 6-9) can be provided pre-cut to one or more standard lengths, rather than an initial roll 70.

More specifically, and with particular reference to FIGS. 1, 2 and 6-9, details of the template segments 10 are described, according to this example embodiment. In this embodiment, each template segment 10 is custom cut, such as by utilizing a knife K (along arrow A of FIGS. 1 and 2) to cut template material dispensed (along arrow B of FIGS. 1 and 2) out of dispenser 80 to a desired length. While the template segment 10 starts out in a spiral roll 70 (FIG. 5), it is formed of a material which readily relaxes into a linear shape, such as that shown in FIGS. 6-9 for a variation of the template segment 10 which are not provided on a roll 70, but rather initially fabricated with specified lengths in linear segments 90.

Each template segment 10 (whether cut off of a roll 70 or provided pre-cut and flat) has a top surface 12 opposite a bottom surface 14 and spaced apart by a thickness of the template segment 10. The thickness is preferably uniform with the surfaces 12, 14 being parallel with each other. The template segment 10 includes a first lateral edge 20 opposite a second lateral edge 30. These lateral edges 20, 30 are preferably parallel with each other so that the template segment 10 has a constant width, and with this width being greater than the thickness between the surfaces 12, 14. The edges 20, 30 are preferably linear or about linear, meaning within about 1% deviation from linear.

Figure 2:
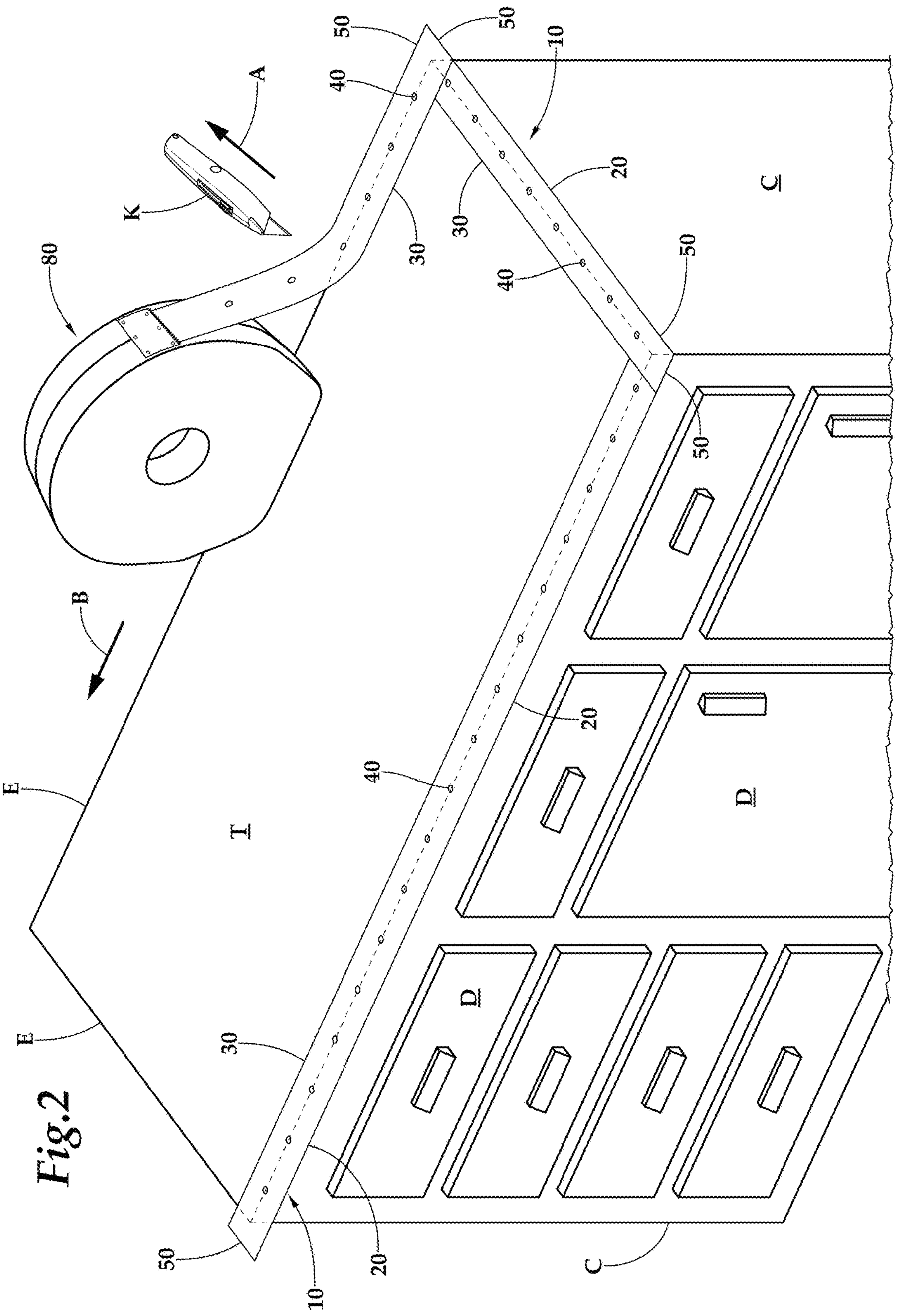
FIG. 2 is a perspective view similar to that which is shown in FIG. 1, but with a third piece of template segment being dispensed from the dispenser to progress toward completion of the full template forming process.

As an alternative, the edges 20, 30 could be non-linear, but instead follow some curving or jagged form, which could be provided on only one of the two edges 20, 30 or on each of the two edges 20, 30. In one embodiment, different forms would be provided for these two edges 20, 30, so that a user could pick the desired shape by placing it overhanging beyond the edges E of the top T of the cabinets C when placing the template segments 10 (FIGS. 1 and 2). For instance, first lateral edge 20 could be provided with a sinusoidal curving pattern, or a sawtooth pattern, or a scalloped pattern, or a crenellated pattern, etc.

Ends 50 of the template segment 10 extend between the edges 20, 30 and define a length of the template segment 10, which length is greater than the width between the edges 20, 30. This length between the ends 50 is customizable by playing out a greater or lesser amount of templating material from the dispenser 80 and off of the roll 70 of templating material, before cutting thereof to define length between the ends 50. Typically these ends 50 are cut to be perpendicular to the edges 20, 30, but could be cut at some diagonal angle to the edges 20, 30. The length is typically cut to be similar to, but slightly more than a corresponding edge E where the template segment 10 is to be placed (such as about a half foot of extra length).

Figure 5:
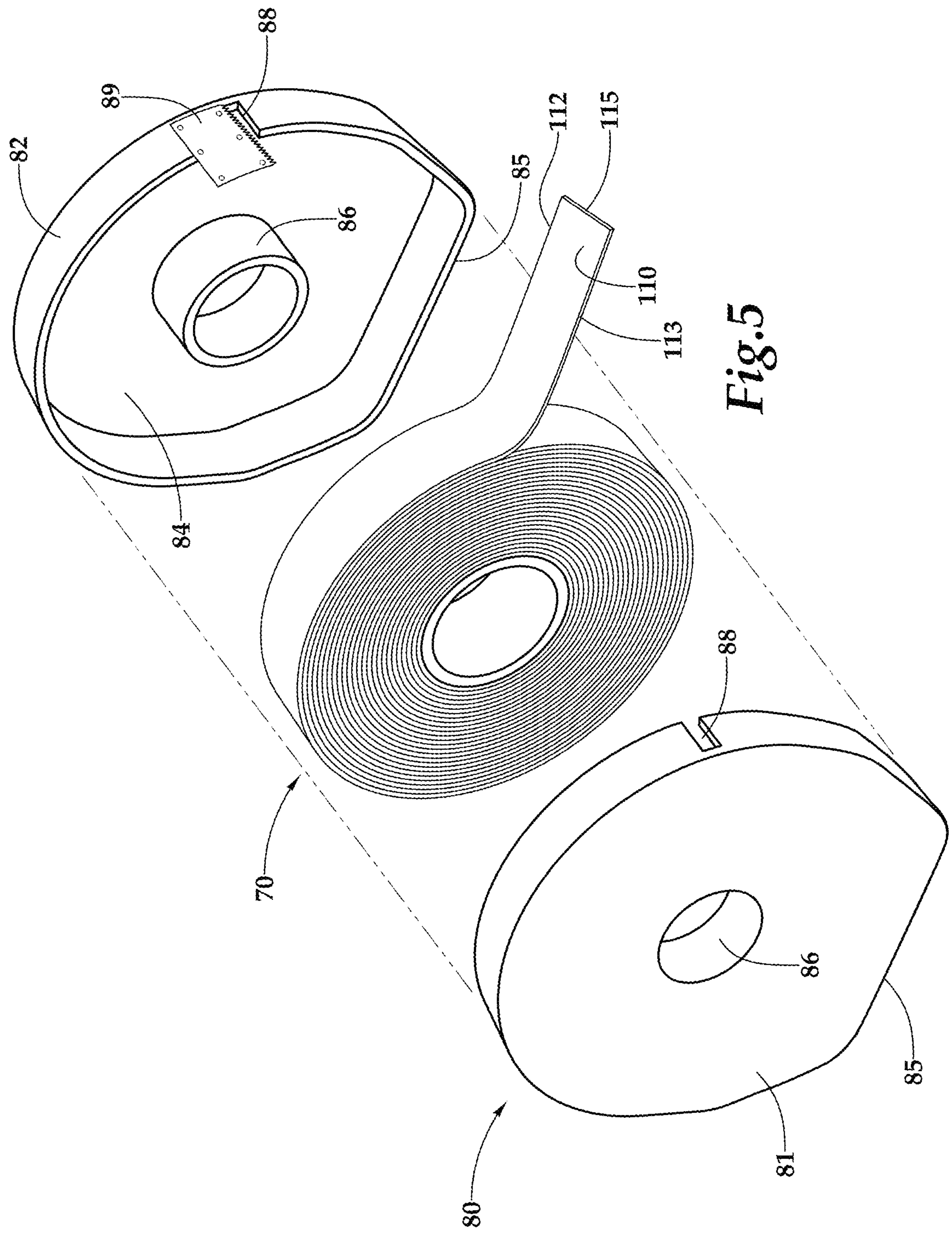
FIG. 5 is an exploded perspective view of a dispenser for holding a roll of templating material which can be dispensed from the dispenser to form template segments, such as those shown in FIGS. 1-3.
Figures 10, 11, 12, 13:
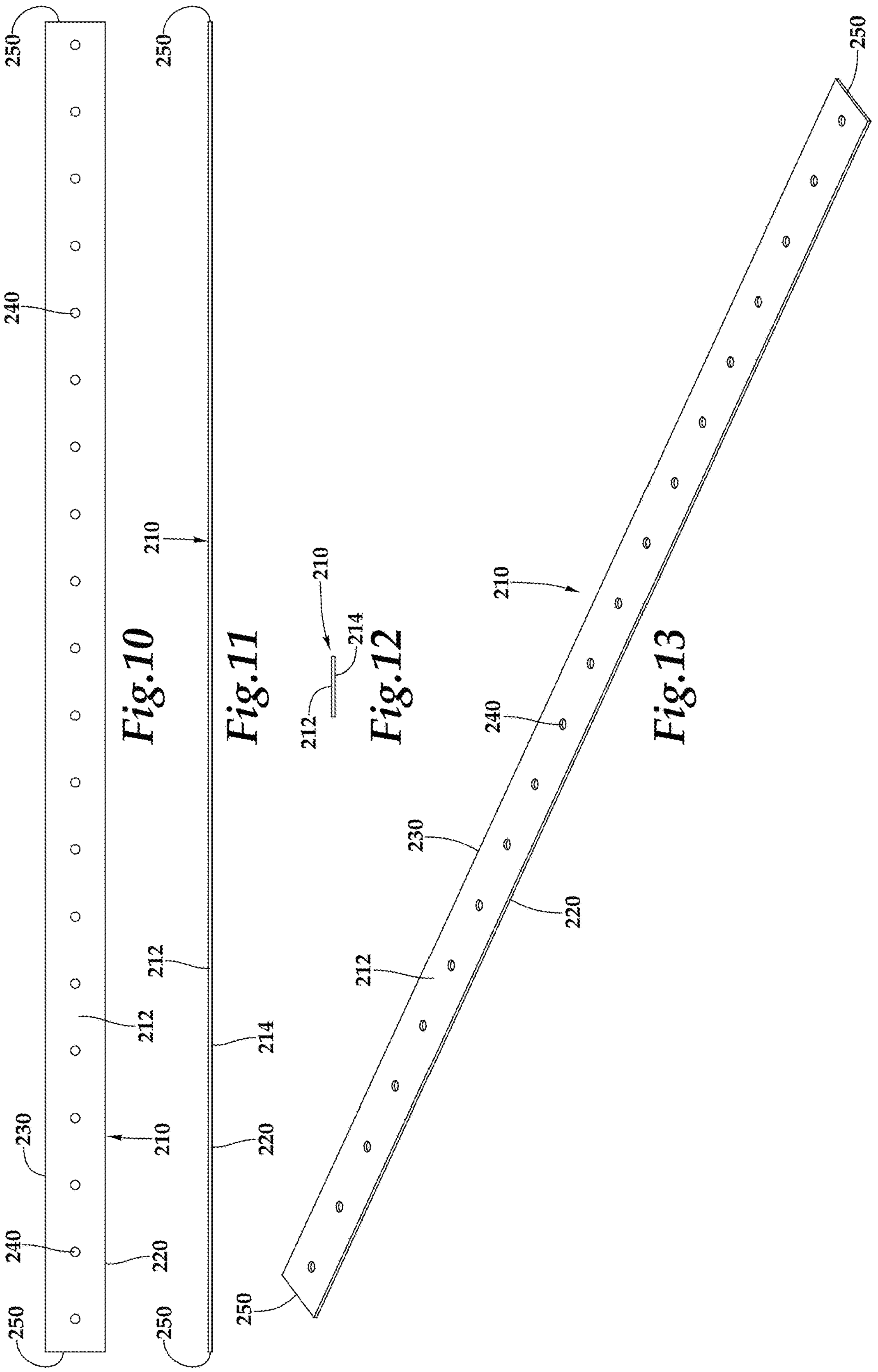
FIG. 10 is a top plan view of a linear template segment with enlarged holes therein, according to one embodiment of this invention.
FIG. 11 as a front elevation view of that which is shown in FIG. 10, the rear elevation view being a mirror image.
FIG. 12 is a left end elevation view of that which is shown in FIG. 10, the right end elevation view being a mirror image.
FIG. 13 is a perspective view of that which is shown in FIG. 10.
Figures 14, 15, 16, 17:
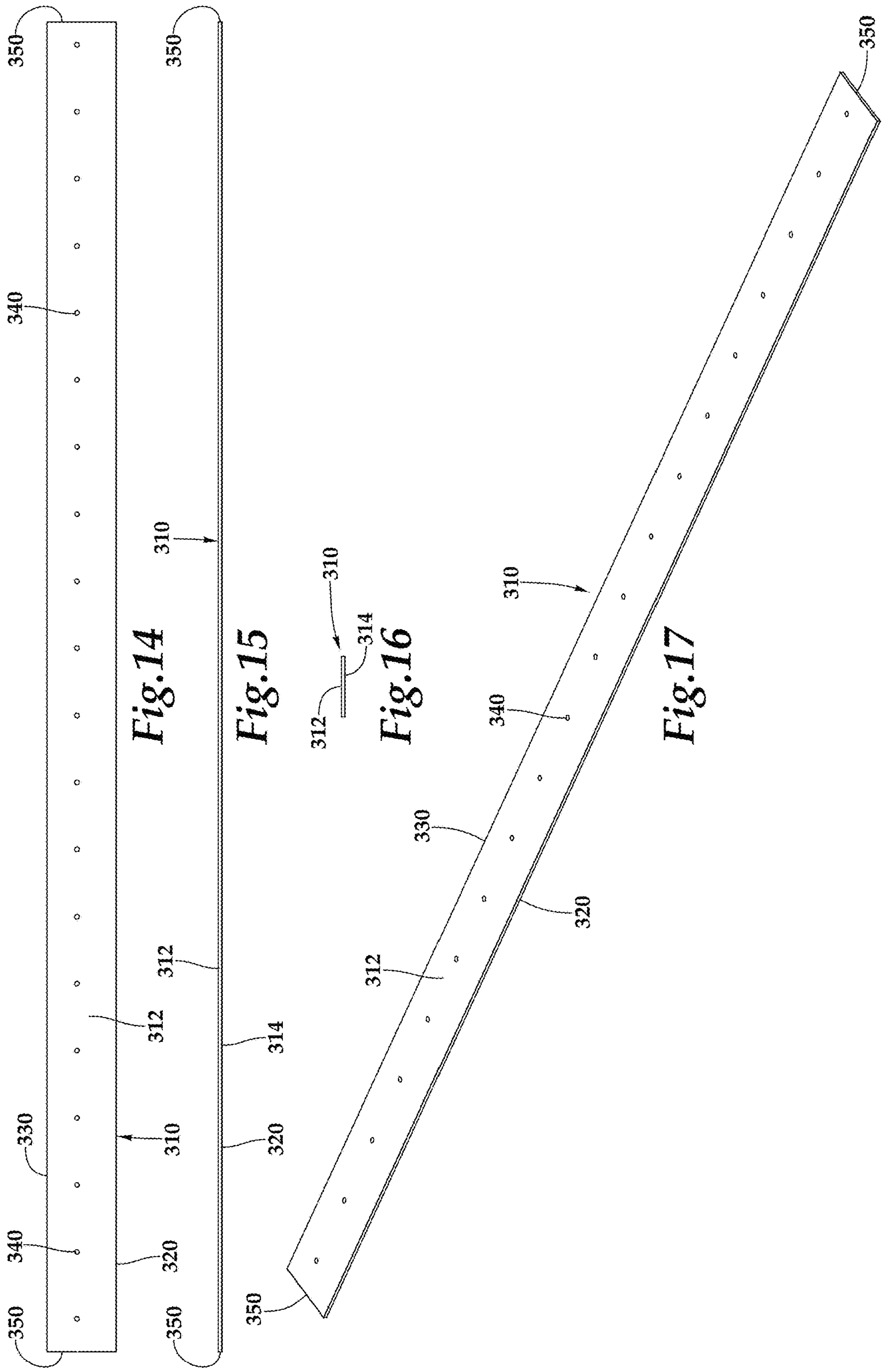
FIG. 14 is a top plan view of a linear template segment with holes therein which are offset from a midline of the template segment, according to one embodiment of this invention.
FIG. 15 as a front elevation view of that which is shown in FIG. 14, the rear elevation view being a mirror image.
FIG. 16 is a left end elevation view of that which is shown in FIG. 14, the right end elevation view being a mirror image.
FIG. 17 is a perspective view of that which is shown in FIG. 14.

In one embodiment, the template segment 10 is initially provided on a roll 70 of spiral templating material, and no holes are provided passing through the template segments cut off of the roll 70. If desired, holes can be later punched into or otherwise formed in the template segment 10 as desired by user. For instance, a user could use a tool, like a hole punch tool used to cut holes in paper to fit in a binder, to place such holes at a midline between the edges 20, 30, or at some location closer to one of the edges 20, 30 and the opposite edge 30, 20. Furthermore, sizing of such holes provided by a user could be selected by the user to match a desired size for the holes. As a further option, the template segment 10 originally provided on the roll 70 could be provided without holes and used without holes. In one embodiment, visible lines provided between the edges, 20, 30, such as a midline halfway between the edges 20, 30 or some other line which is closer to one edge 20, 30 than to the other edge 30, 20 could be provided for hole-less template segment 110 alignment (FIG. 5).

In one embodiment, midline holes 40 are pre-formed into the roll 70 of templating material so that as the template segments 10 are cut to size, the midline holes 40 are already provided therein. Such midline holes 40 would be located at a midpoint between the first lateral edge 20 and the second lateral edge 30 in this example embodiment.

Various different sizes could be provided for the template segments 10. In one embodiment, the template segment 10 is about 3¼ inches wide between the edges 20, 30 and with the midline holes 40 having about a quarter inch diameter, so that material spanning a distance of 1½ inches extends between edges of the midline hole and each lateral edge 20, 30. In other embodiments, the hole could be larger and still centered, and the width between the edges 20, 30 could be the same. Alternatively, various different widths for the template segment 10 could be provided between the edges 20, 30. Generally, spacing between the midline holes 40 and the edges 20, 30 represent a desired amount of overhang for a finished edge F of a countertop CT to exhibit relative to edges E of underlying cabinets C (see FIGS. 1-4). The holes 40 are provided periodically between the ends 50, such as at about six inch intervals for instance. Other spacing between the midline holes 40 could alternatively be provided, either regular or irregular. In an alternative embodiment discussed in detail below, the holes 40 could be provided closer to one edge 20, 30 than to the other edge 30, 20.

Material forming the template segment 10 is preferably styrene. The thickness is selected sufficiently thin to allow the template material to roll up into the spiral roll 70 (FIG. 5) without cracking at normal temperatures at which the material would be stored, transported and/or used, such as above about −40° F. Styrene material preferably has sufficiently low shape memory that it can be played off of the roll 70 and flattened, and relatively quickly be converted into the template segment 10 being substantially linear. In this embodiment, this thickness between the surfaces 12, 14 is about 1/16 inch.

When template segments 10 have been placed upon a top T of a cabinet C adjacent to edges, either of ends 50 or portions of template segments 10 and ends 50 thereof will overlap each other near corners where these separate edges E of the cabinet C come together. At these overlapping locations, the template segments 10 have their relative positions established, typically including both angular orientation and amount of spacing/overlap. Such establishing of relative position can be by having the template segments 10 joined together in a permanent fashion. The template segments 10 joined together in this way provide a full template 60 (FIG. 3) with outer edges thereof providing a guideline for cutting of a slab S or other planar sheet of material to form the countertop CT with finished edges F that are located where desired, overhanging the top T of the cabinet C.

Such joining of template segments 10 together could occur by utilizing a suitable styrene solvent or adhesive, such as a PVC solvent. Alternatively, a mechanical fastener such as a stapler or a riveter could be utilized. As a further alternative, adhesive tape could be utilized. As a further alternative, some form of clamp could be utilized. As an alternative to fastening the template segments 10 together where they overlap, the template segments 10 could have their relative positions established by marking the segments 10 (or at least one of them) where they overlap, so that the template segments 10 can be reconstructed into the full template 60 upon the slab S with a similar amount of overlap (see FIG. 3), such as by aligning such markings in the same manner that they overlapped when placed upon the top T of the cabinet C (FIGS. 1 and 2).

While the roll 70 of templating material could be handled without any dispenser, preferably dispenser 80 is provided to assist in managing the roll 70 (FIG. 8). With or without the dispenser 80, the roll 70 preferably has a central core which is open, so that an innermost edge of the roll 70 does not need to curve too sharply. In one embodiment, this open central core has a diameter of at least about half a foot. In another embodiment, the central core has a diameter of at least about a foot. In one embodiment, an outer diameter of the spiral roll 70 is about two feet. A piece of tape can hold a free end 50 of the roll 70 to adjacent portions of the templating material to keep the roll 70 tightly wound until templating material is to be played off of the roll 70 for forming template segments 10.

In one embodiment of this invention, a dispenser 80 is utilized which includes an annular recess 84 therein shaped similarly and sized similarly to the roll 70. The dispenser 80 in one embodiment includes a first half 81 second half 82 which are similar to each other and provide a form of clamshell interaction which is openable at a peripheral seam 83 to allow for rolls 70 to be loaded into the dispenser 80. When the halves 81, 82 are joined together at the seam 83, the dispenser 80 is ready for use. When the roll 70 has been depleted, a new roll 70 can be placed into the dispenser 80 by removing the two halves 81, 82 from each other (see FIG. 4). The two halves are then rejoined together to re-capsulate the roll 70 therein.

The dispenser 80 includes the annular recess 84 in which the roll 70 can be located. This annular recess 84 surrounds a central hub 86. A lowermost portion of a perimeter wall of the dispenser 80 is preferably flattened to form a base 85 and to allow the dispenser 80 to stand on this peripheral edge like feet thereof where it is flattened into the base 85. A slot 88 is also provided within this peripheral edge and elevated above the base 85. The slot 86 is sized large enough to allow for templating material to be played off of the roll 70 and through the slot 88 for removal from the dispenser 80. A rigid metal (or other hard material) cutting guide 89 is provided adjacent to the slot 88. A cutting tool, such as a knife K, can thus readily abut against this cutting guide 89 for cutting of the templating material to form an end 50 of a template segment 10 (or the knife K can at least score the templating material sufficiently to allow for the templating material to be snapped along such a score line to form one of the ends 50 of the template segment 10). In one embodiment, slot 88 is formed in each of the two halves, but the cutting guide 89 is attached only one of the two halves 81, 82 and overlaps the other of the two halves 82,81. The cutting guide 89 can be attached with rivets or fasteners to either one or both of the halves 81, 82.

As an alternative to the roll 70 of templating material cut to form template segment 10, linear segments 90 can be provided in advance at fixed length. As one option, such lengths could be eight feet long. FIGS. 6-9 show such linear segments 90 according to one embodiment of this invention. The linear segments 90 include the top surface 12 opposite the bottom surface 14, and with opposing lateral edges 20, 30 extending between ends 50. A series of midline holes 40 pass through the linear segment 90.

In an alternative embodiment, hole-less template segments 110 are provided (FIG. 5), and would typically be provided on a roll 70 and cut off of the roll 70. The hole-less template segment 110 has a width between the first lateral edge 112 and a second lateral edge 113. Ends 115 of the hole-less template segment 110 would be provided by cutting of the roll 70 at desired positions to provide a length for the hole-less template segment 110.

With particular reference to FIGS. 10-13, in a further alternative embodiment a larger hole template segment 210 is provided. This template segment 210 can be similar to the template segment 10 or linear segment 90, except that larger holes 240 are provided between a first lateral edge 220 and a second lateral edge 230 and extending between a top surface 212 and bottom surface 214 and along a midline extending between ends 250. The larger holes 240 can be preferred, in some instances, to more easily be able to see the edges E of the top T of the cabinet C, during placement of the template segments 210 in a manner similar to that depicted with regard to the template segments 10 in FIGS. 1 and 2.

With particular reference to FIGS. 14-17, details of an alternative embodiment off midline hole template segment 310 are described. In this embodiment, lateral edges 320 330 are spaced a differing distance from off midline holes 340 passing through the template segments 310 from a top surface 312 to a bottom surface 214. These lateral edges 320, 330 extend between ends 350. In this embodiment, the holes 340 are located closer to one of the lateral edges 320, 330 than to the other of the lateral ledges 330, 320. For instance, if the template segment 310 is 3¼ inches wide between the edges 320, 330, the holes 340 could be one inch from the first lateral edge 320 and two inches from the second lateral edge 330. A user could then decide whether an overhang of one inch or two inches is preferred, and orient the template segment 310 appropriately upon edges E of the top T of the cabinet C, to provide the desired overhang for the finished edge F of the countertop CT (FIGS. 1-4). If a greater amount of overhang is desired, typically tape would be utilized when placing the template segments 310 upon the top T of the cabinets C adjacent to the edge E, to keep the template segments 310 from falling off of the edges E under force of gravity acting upon the template segments 310. Other dimensions could alternatively be provided for the holes 340 and spacing between the edges 320, 330 of this off midline hole template segment 310 embodiment.

In use and operation, and with particular reference to FIGS. 1-4, details of the use of the template segment 10 (or linear segment 90, or hole-less template segment 110, or larger hole template segment 210, or off midline hole template segment 310) are described, according to one example embodiment. Initially, template segments 10 are required. This can occur by dispensing templating material out of the slot 88 of the dispenser 80 (or otherwise off of a roll 70) and cutting the material to a desired length generally matching a length of an edge E of a top T of a cabinet C which is to be fitted with a countertop CT with a finished edge F which overhangs over the edge E of the cabinet C. While cabinets C and top T thereof are referenced, these terms should be broadly construed to reference any underlying structure which is to have a countertop CT or other solid surfacing or similar layer placed thereon. Similarly, while countertops CT are referenced as one example of solid surfacing or other surface layers, the term countertop should be broadly construed to reference any overlying planar surface of sheet or slab or similar material.

As an alternative to custom forming a length of template segment 10, linear segments 90 can be selected and then cut to size. Alternatively, and if a greater length is required, multiple linear segments 90 can be bonded together, or otherwise joined together, or marked for later placement with a similar amount of overlap provided when initially placed upon the edges E on the top T of the cabinets C. Once the template segments 10, 90, 110, 210, 310 have been placed where desired, they can be precisely aligned with the edges E which edges E are visible through the holes 40 in the template segments 10, 90, 110, 210, 310. Next, the template segments 10 are attached together (or otherwise have their relative position established) where they overlap, to form the full template 60 (FIG. 3).

Typically, countertop CT fabrication occurs in a fabrication shop spaced from where the cabinet C is located. Thus, typically the template segments 10 which have been formed into the full template 60 are either transported separately or as the hole template 60 to the location where the slab S (or other sheet of countertop material) is located that is to be cut into the countertop CT with the desired finished edges F overhanging the edges E in the top T of the cabinet C. At the location of the slabs, the template 60 is laid out upon the slab S (or separate template segments 10 are reconstructed into the full template 60 upon the slab S). Typically, the full template 60, once having been reconstructed if necessary, is placed in various different orientations on the slab S until the fabricator is happy with the appearance that will be provided in the finished countertop CT. If multiple slabs S are required, they can be brought adjacent to each other during this layout process and utilizing the full template 60. Once such basic layout has been completed, the full template 60 can optionally be attached to the slab S, such as with tape to hold the full template 60 in position where desired.

Figure 3:
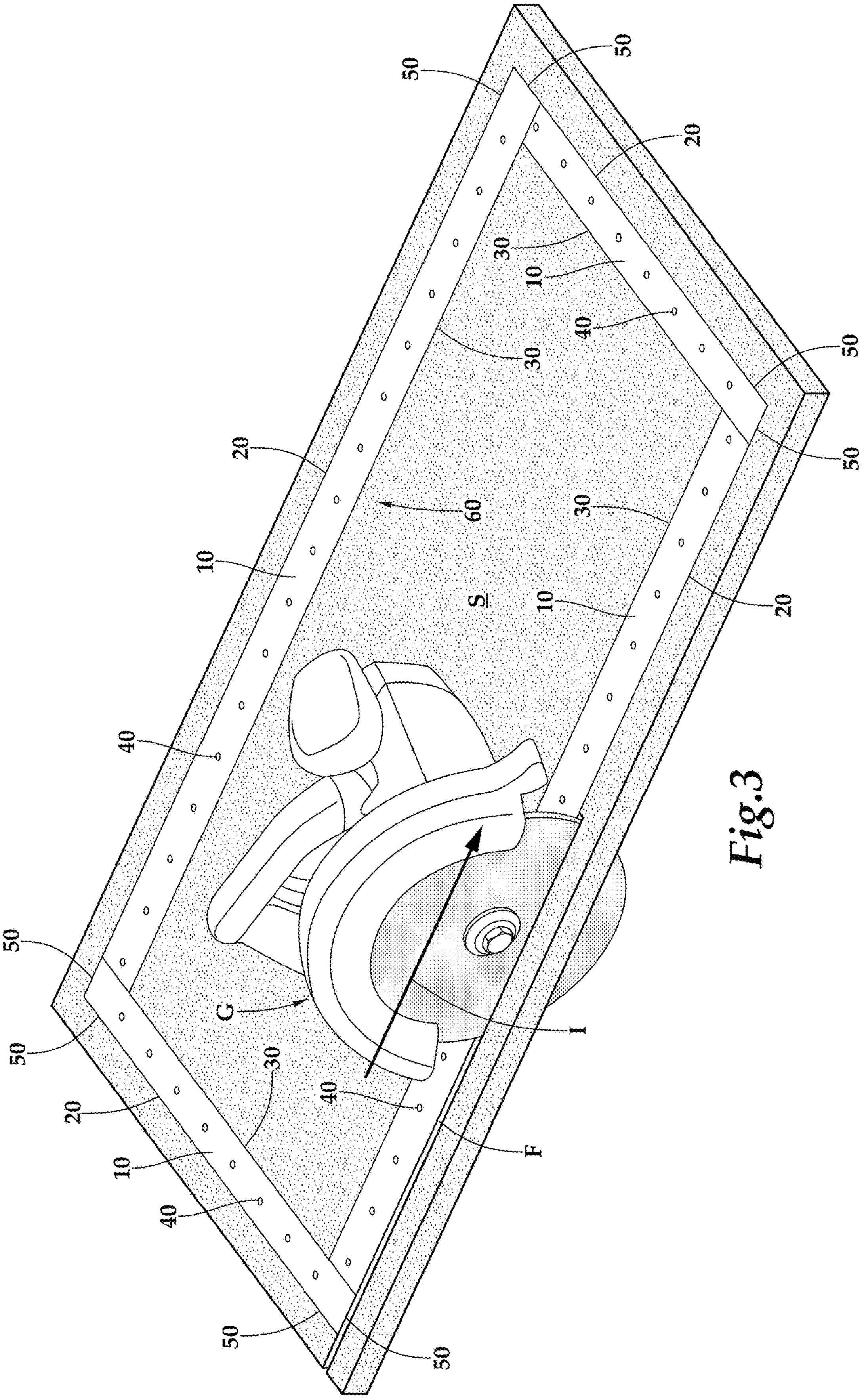
FIG. 3 is a perspective view of a completed full template made up of four separate template segments, and attached to a slab/sheet of material, and with the slab of material in the process of being cut to have a desired size including an overhang.
Figure 4:
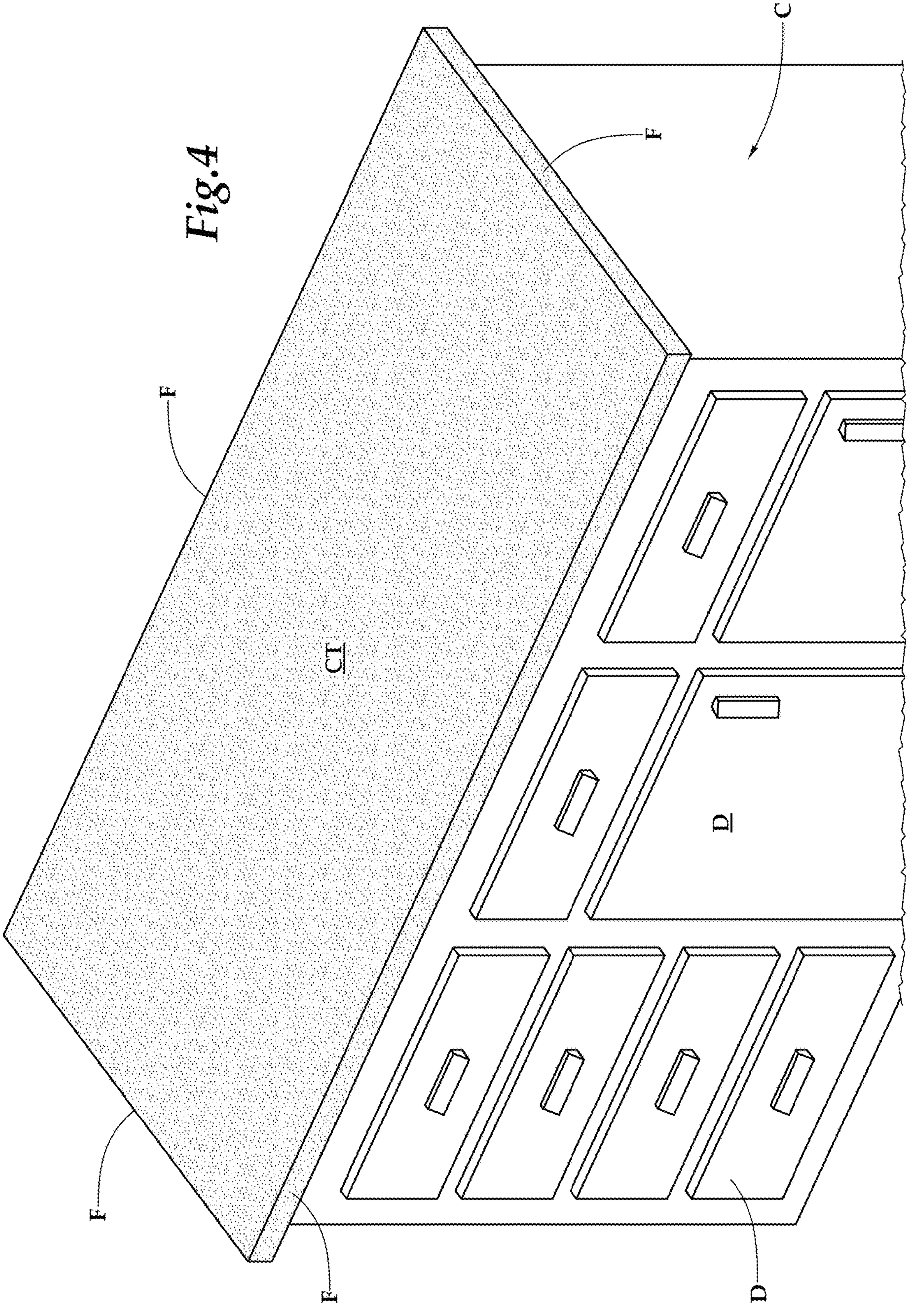
FIG. 4 is a perspective view of a cabinet with the fully cut countertop according to this invention having been placed thereon, and with a desired overhang for finished edges of the countertop.

Various grinding tools G or other cutting tools are then utilized to cut the slab S (along arrow I of FIG. 3 for example). In particular, a grinding tool G or other cutting tools cut the slab S adjacent to an outermost edge of the full template 60, which is providing the finished edge F for the countertop CT. While cutting can occur adjacent to an edge of the full template 60, as an alternative the full template 60 can be placed and then the slab S can be marked (such as with a marking line) adjacent to the outermost edge of the full template 60, to identify a line along which the slab S is to be cut. The full template 60 can then be removed if desired. After the slab S has been fully cut, the countertop CT with finished edge F has been constructed. It can then be transported to the location of the cabinets C and placed upon the top T and overlying the edges E, with a desired amount of overlap having been provided for the finished edge F of the countertop CT. Finished cabinet C with drawers/doors D has thus been completed, and with a countertop CT having a finished edge F with a desired amount of overhang having been provided.

This disclosure is provided to reveal a preferred embodiment of the invention and a best mode for practicing the invention. Having thus described the invention in this way, it should be apparent that various different modifications can be made to the preferred embodiment without departing from the scope and spirit of this invention disclosure. When embodiments are referred to as "exemplary" or "preferred" this term is meant to indicate one example of the invention, and does not exclude other possible embodiments. When structures are identified as a means to perform a function, the identification is intended to include all structures which can perform the function specified. When structures of this invention are identified as being coupled together, such language should be interpreted broadly to include the structures being coupled directly together or coupled together through intervening structures. Such coupling could be permanent or temporary and either in a rigid fashion or in a fashion which allows pivoting, sliding or other relative motion while still providing some form of attachment, unless specifically restricted.

What is claimed is:

1. A method for providing a template for use in forming a countertop for a cabinet top from a sheet of original countertop material, and with the countertop having an overhang extending beyond at least one edge of the cabinet top being covered by the countertop, the method including the steps of:

placing a first template segment over an edge of the cabinet top which is to have the countertop overhang the cabinet top;

said placing step including the template segment having two parallel lateral edges extending along opposing sides of a longest dimension of the template segment;

said placing step including the template segment having a plurality of holes passing through the template segment at similar spacings away from the lateral edges of the template segment, the holes spaced from at least one of the lateral edges by a distance about as much as an amount of overhang of the countertop beyond edges of the cabinet top;

repeating said placing step with a second template segment on a second edge of the cabinet top;

establishing relative position of the first template segment to the second template segment;

removing at least the first and second template segments from the cabinet top which is to have the countertop placed thereon;

positioning at least the first and second template segments onto a sheet of the countertop material;

cutting the sheet of countertop material along at least portions of the first and second template segments; and affixing the countertop resulting from said cutting step upon the cabinet top, and in an arrangement matching an arrangement associated with the template segments of said placing step and said repeating step, and with the overhang of the countertop beyond the edge of the cabinet top being about the size of spacing of the holes of the template segment away from at least one of the lateral edges of the template segment which is to have the solid surface material placed around, being replicated by the solid surfacing material.

2. The method of claim 1 wherein said placing step includes the holes passing through a midline between the lateral edges of the template segment.

3. The method of claim 2 wherein the template segment is about 3.25 inches between lateral edges, and with the holes being about ¼ inch in diameter, with an about 1.5 inch spacing between the holes and each of the lateral edges.

4. The method of claim 2 wherein said holes are located closer to one of the lateral edges of the templating material than to the other of the lateral edges of the templating material.

5. The method of claim 4 wherein said placing step includes the templating material having indicia visible thereon, identifying spacing between the holes and at least one of the lateral edges.

6. The method of claim 1 wherein said placing step is preceded by a step of cutting a length of templating material from a roll of templating material to form the template segment.

7. The method of claim 6 wherein said cutting step includes the step of measuring an edge of a surface to be covered with solid surface material, and then cutting the templating material to have a length generally matching that of said measuring step, within about half a foot.

8. The method of claim 1 wherein said establishing relative position step includes attaching at least two individual template segments together where they come together at edges of the cabinet top to be covered by the countertop.

9. The method of claim 1 wherein said placing step includes looking through the holes in the template segment and moving the template segment until the edge of the cabinet top is visible through the hole.

10. The method of claim 1 including the further step of temporarily securing the template segment to the cabinet top which is to have the countertop placed thereon.

11. The method of claim 1 wherein said establishing relative step includes marking individual template segments where they come together with marking to allow for the template segments to be positioned upon a sheet of the countertop material during said positioning step at positions for the template segments matching about where the template segments were positioned during said placing step.

* * * * *